(12) United States Patent
Miyazaki et al.

(10) Patent No.: US 7,621,682 B2
(45) Date of Patent: Nov. 24, 2009

(54) OPTICAL DEVICE, LENS-BARREL, IMAGE PICKUP APPARATUS AND ELECTRONIC APPARATUS

(75) Inventors: Rei Miyazaki, Chiba (JP); Masaki Ando, Chiba (JP); Kazuhiro Tanaka, Tokyo (JP)

(73) Assignee: Sony Corporation (JP)

( * ) Notice: Subject to any disclaimer, the term of this patent is extended or adjusted under 35 U.S.C. 154(b) by 400 days.

(21) Appl. No.: 11/332,454

(22) Filed: Jan. 13, 2006

(65) Prior Publication Data
US 2006/0193069 A1 Aug. 31, 2006

(30) Foreign Application Priority Data
Jan. 14, 2005 (JP) ............................ P2005-008040
Nov. 30, 2005 (JP) ............................ P2005-346444

(51) Int. Cl.
*G03B 17/00* (2006.01)
(52) U.S. Cl. .................. 396/439; 348/342; 359/585
(58) Field of Classification Search ................. 396/439, 396/448, 661, 241; 348/342, 360, 340, 335; 359/541, 580, 584–590; 428/216
See application file for complete search history.

(56) References Cited

U.S. PATENT DOCUMENTS

| | | | | | |
|---|---|---|---|---|---|
| 5,029,010 | A | * | 7/1991 | Shiraishi | 348/347 |
| 5,453,859 | A | * | 9/1995 | Sannohe et al. | 359/588 |
| 5,952,084 | A | * | 9/1999 | Anderson et al. | 428/212 |
| 6,235,398 | B1 | * | 5/2001 | Nakamura et al. | 428/432 |
| 6,337,124 | B1 | * | 1/2002 | Anderson et al. | 428/216 |
| 2003/0001960 | A9 | * | 1/2003 | Kato et al. | 348/342 |
| 2004/0114114 | A1 | * | 6/2004 | Yano et al. | 353/84 |
| 2005/0018301 | A1 | * | 1/2005 | Uehara | 359/586 |

FOREIGN PATENT DOCUMENTS

JP 02-094296 A 4/1990

* cited by examiner

*Primary Examiner*—Melissa J. Koval
*Assistant Examiner*—Autumn Parker
(74) *Attorney, Agent, or Firm*—Lerner, David, Littenberg, Krumholz & Mentlik, LLP

(57) ABSTRACT

An optical device includes a transparent substrate, and a multi-layer film including a dielectric film having a multi-layer structure formed on the transparent substrate, and a transparent conductive thin film having a predetermined thickness formed at a part of the dielectric film. The transparent conductive thin film may be formed at the outermost layer of the dielectric film and may have a thickness of 5 to 20 nm.

28 Claims, 7 Drawing Sheets

OPTICAL DEVICE, LENS-BARREL, IMAGE PICKUP APPARATUS AND ELECTRONIC APPARATUS

CROSS-REFERENCE TO RELATED APPLICATIONS

The present application claims priority from Japanese Patent Application Nos. JP 2005-008040 filed on Jan. 14, 2005, and JP 2005-346444 filed on Nov. 30, 2005, the disclosures of which are hereby incorporated by reference herein.

BACKGROUND OF THE INVENTION

The present invention relates to an optical device suitably applicable, for example, to a camera lens, an optical filter or the like, a lens-barrel for holding the optical device, and an image pickup apparatus and an electronic apparatus on which the optical device is mounted.

Conventionally, in image pickup devices and the like such as lens, optical filter, and CCD (Charge Coupled Device) used for cameras, debris or dust and the like deposited on the surface of the device may be actually outputted as an image, which constitutes a large proportion of the factors worsening the yield in the manufacturing process of the product. Therefore, prevention of the deposition of debris or dust has been an important problem to be solved for enhancing the yield.

As a measure against the problem, a method has been generally used in which the component parts are cleaned ultrasonically, and then the component parts are assembled into the desired product in a clean room sufficiently deprived of debris and dust. However, provision of an ultrasonic cleaning machine and a clean room for this purpose requires a huge cost, leading to an increase in the manufacturing cost and, hence, to a rise in the price of the product.

In view of the above, as a method requiring neither an ultrasonic cleaning machine nor a clean room, a method may be contemplated in which the surface of a lens or the like is provided with an antistatic effect while retaining an anti-reflection function, to thereby prevent the deposition of debris or dust which might otherwise arise from static electricity. As to the technique of providing also the antistatic effect while retaining the anti-reflection effect, a number of reports have been made in which a transparent conductive thin film is used. For example, Japanese Patent Laid-open No. Hei 2-94296 proposes a laminate film composed of a transparent dielectric film and a transparent conductive thin film, for the purpose of eliminating electrostatic charges generated on surface panels of various computer displays, CRTs of TV receivers, etc.

However, all the above-mentioned techniques are characterized in that the antistatic effect is obtained by grounding a transparent conductive thin film, and it may therefore be necessary to provide an electrode for exclusive use and to conduct a grounding treatment. Accordingly, in the case of applying the above-mentioned configuration to an optical device, for example, a lens of a camera, it may be necessary for the wiring and grounding to be carried out by taking into account a movable portion for adjusting the focus, so that it is very difficult to conduct the wiring. Further, since it may be necessary to take out the electrode for grounding the transparent conductive thin film, it may be necessary to conduct an etching treatment after the formation of the laminate film or to mask the electrode portion during the film forming step, with the result of an intricate manufacturing process.

Thus, there is a need to provide an optical device which has both an antistatic effect and an optical multi-layer effect and which is free of the need for a grounding treatment for prevention of electrostatic charging, and an image pickup apparatus and an electronic apparatus on which the optical device is mounted.

As for the level of the antistatic effect, particularly, there is a need not for eliminating the strong electrostatic charges generated on a surface panel of a TV CRT or the like, but for eliminating the weak electrostatic charges which would spontaneously attract dust and debris suspended in a natural space.

SUMMARY OF THE INVENTION

In order to solve the above-mentioned problems and fulfill the above-mentioned needs, according to an embodiment of the present invention, there is provided an optical device including a transparent substrate; and a multi-layer film including a dielectric film of a multi-layer structure formed on a surface of the transparent substrate, and a transparent conductive thin film having a predetermined thickness formed at a part of the layers of the dielectric film.

According to the above configuration, the films are formed by taking into account the position of the transparent conductive thin film in the multi-layer film and the thickness of each of the films, whereby it is possible to obtain an optical device which is free of the need for a grounding treatment and which has both an antistatic effect and an optical multi-layer effect.

In the optical device as above, preferably, the transparent conductive thin film is provided at an outermost layer of the dielectric film.

According to this configuration, a greater debris deposition improving effect (antistatic effect) can be obtained as compared with the case where the transparent conductive thin film is not present at the outermost layer.

Besides, in the optical device as above, preferably, a thin film is provided on an outer layer side relative to the transparent conductive thin film, the thin film having a thickness less than or equal to 150 nm and/or a dielectric constant less than or equal to 20.

According to such a configuration, the thin film satisfying the above-mentioned conditions is provided on the outer layer side relative to the transparent conductive thin film, whereby it is possible to obtain more assuredly an optical device which has both an antistatic effect and an optical multi-layer effect.

According to another embodiment of the present invention, there is provided a lens-barrel including a barrel; and an optical device held on the barrel, the optical device including a transparent substrate, and a multi-layer film including a dielectric film of a multi-layer structure formed on a surface of the transparent substrate, and a transparent conductive thin film having a predetermined thickness formed at a part of the layers of the dielectric film.

According to this configuration, since the optical device held on the barrel is free of the need for a grounding treatment and has both an antistatic effect and an optical multi-layer effect, the lens-barrel can be mounted to and detached from an image pickup apparatus or the like, and the deposition of debris or dust at the times of the mounting and detaching can be prevented.

According to a further embodiment of the present invention, there is provided an image pickup apparatus including an optical device disposed in an optical path; and an image pickup device disposed in the optical path; the optical device including a transparent substrate, and a multi-layer film including a dielectric film of a multi-layer structure formed on a surface of the transparent substrate, and a transparent conductive thin film having a predetermined thickness formed at a part of the layers of the dielectric film.

According to this configuration, since the optical device is free of the need for a grounding treatment, the optical device can be disposed, for example, at a movable portion of a barrel retractable type lens-barrel of an image pickup apparatus. In addition, since the optical device has both an antistatic effect and an optical multi-layer effect, the deposition of debris or dust on the surface of the optical device can be prevented, and images with little influence of debris or dust can be picked up.

According to yet another embodiment of the present invention, there is provided an electronic apparatus for displaying information by transmitting light generated inside the apparatus through an optical device disposed in an optical path, the optical device including a transparent substrate, and a multi-layer film including a dielectric film of a multi-layer structure formed on a surface of the transparent substrate, and a transparent conductive thin film having a predetermined thickness formed at a part of the layers of the dielectric film.

According to this configuration, since the optical device has both an antistatic effect and an optical multi-layer effect, the deposition of debris or dust on the surface of the optical device disposed in the optical path can be prevented, and images with little influence of debris or dust can be displayed.

In accordance with the present invention, the position of the transparent conductive thin film in the multi-layer film provided by coating on the optical device and the dielectric constant of the dielectric film disposed on the outer layer sides of the transparent conductive thin film are taken into account, whereby it is possible, without conducting a grounding treatment, to obtain a high-function optical device which has both an antistatic effect for suppressing the deposition of debris or dust and an optical effect owing to a multi-layer structure.

Therefore, when the present invention is applied to an optical device such as a lens and an IR cut filter, the possibility of depositing debris or dust on the optical device is lowered, so that it is possible to eliminate the need for an ultrasonic cleaning machine for cleaning the lens and the need for a clean room for assembling the component parts in the manufacturing site of the lens-barrel or the like. Thus, the manufacturing cost can be largely reduced.

In addition, since the need for a grounding treatment for the prevention of electrostatic charging is eliminated, the optical device according to the present invention can be used even at a movable portion, such as a camera lens with a focus adjusting function.

Besides, where the optical device according to the present invention is applied to an image pickup apparatus such as a lens exchange type camera or to an electronic apparatus such as a projector, the deposition of debris or dust on a lens, an IR cut filter, a solid state image pickup device or the like is prevented, so that high-quality images with little influence of debris or dust can be obtained.

DETAILED DESCRIPTION

Figure 1:
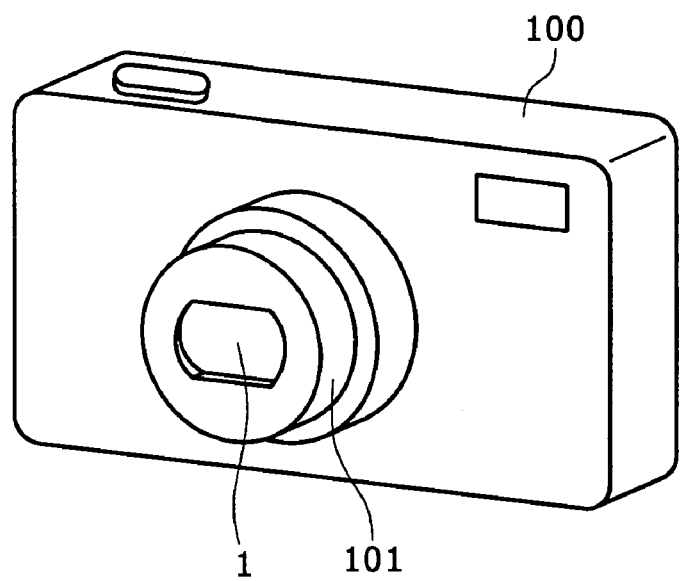
FIG. 1 shows an example (1) of a camera equipped with an optical device according to the present invention.

Now, an embodiment of the optical device according to the present invention will be described in detail below referring to the drawings.

FIG. 1 shows an embodiment of a still camera (image pickup apparatus) to which an optical device according to the present invention has been applied. In FIG. 1, the optical device 1 which is a camera lens is mounted on a barrel retractable type movable portion 101 functioning also as a lens-barrel of a camera 100. The optical device 1 is held on the barrel of the movable portion 101.

Figure 2:
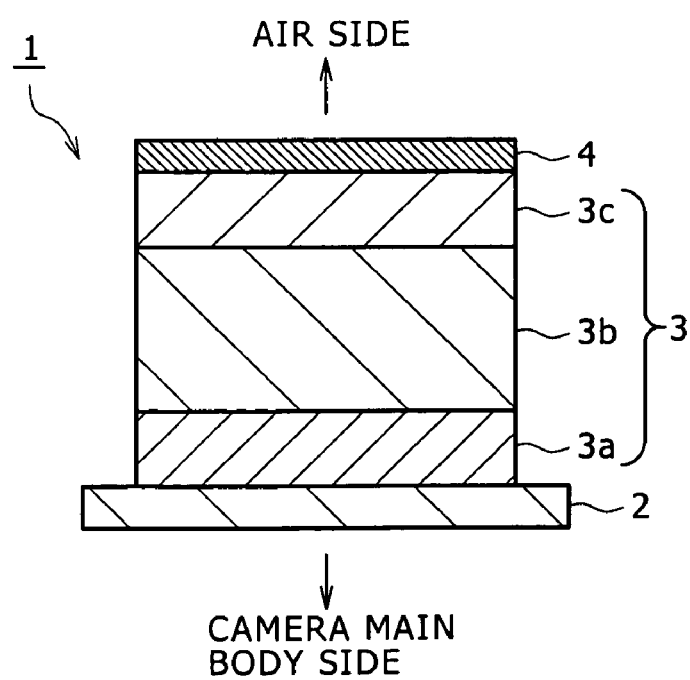
FIG. 2 is a schematic sectional diagram showing the configuration of an optical device according to an embodiment of the present invention.

FIG. 2 is a schematic sectional diagram showing the configuration of an embodiment of the optical device according to the present invention. The optical device 1 in this embodiment includes, on a transparent substrate 2 formed of a glass or plastic or the like, a multi-layer film (anti-reflection film) which is composed of a transparent dielectric layer 3 composed of first to third dielectric films 3a to 3c different in refractive index for an anti-reflection purpose, and a transparent conductive thin film 4. While the dielectric layer 3 is formed by laminating the three dielectric films in this example, it suffices for the dielectric layer 3 to provide a desired anti-reflection effect, and the number of the layers constituting the dielectric layer 3 is not limited to the number (three) in this embodiment. In addition, FIG. 2 shows also the positional relationships among the layers, but does not show the relationships among the film thicknesses of the layers.

In the optical device 1 as above, the first dielectric film 3a constituting the dielectric layer 3 and formed on the upper surface of the transparent substrate 2 is a dielectric composed of an intermediate refractive index material, for example, aluminum oxide or the like, which has a film thickness of $\lambda/4$ ($\lambda$: wavelength of light). In addition, the second dielectric film 3b formed on the upper surface of the first dielectric film 3a is a dielectric composed of a high refractive index material, for example, $Ta_2O_5$ or the like, which has a film thickness of $2/4\lambda$. Besides, the third dielectric film 3c is a dielectric composed of a low refractive index material, for example, magnesium fluoride or the like, which has a film thickness of $\lambda/4$. Examples of the low refractive index material include not only magnesium fluoride but also silicon oxide, fluorine-containing inorganic or organic materials, silicon-containing inorganic or organic materials, and mixed materials containing at least any one of these materials. The thicknesses of the first to third dielectric films thus laminated are set to optimum values for enabling effective reflection of external light, according to the refractive index and the thickness of the transparent conductive thin film 4 and the like.

Furthermore, examples of the material of the transparent conductive thin film 4 constituting the outermost layer of the optical device 1 include oxide thin films of ITO (Indium-doped tin oxide), FTO (Fluorine-doped tin oxide), ATO (Antimony-doped tin oxide), $In_2O_3$, $SnO_2$, ZnO and the like, and metal thin films of gold, silver, copper, aluminum and the like. Combinations of these may also be adopted. In this example, ITO is used for the transparent conductive thin film 4.

The films of these materials constituting the anti-reflection film may be formed by such techniques as vacuum evaporation, ion plating, and sputtering. In this embodiment, for example, the dielectric layer 3 is formed by a vacuum evaporation method in which the materials of the first to third dielectric films 3a to 3c are sequentially heated and vaporized by resistance heating, electron beam heating or the like in a vacuum chamber evacuated to a pressure of about $8.0\ e^{-4}$ (Pa), whereby the films are formed on the transparent substrate 2. Similarly, the transparent conductive thin film 4 may be formed, for example, by a vacuum evaporation method in which the thin film is formed by heating and vaporization by electron beam heating or the like while introducing oxygen into a vacuum chamber, once evacuated to a pressure of about $8.0\ e^{-4}$ (Pa), so as to obtain an oxygen pressure of about $2.5\ e^{-4}$ (Pa). The film resistance (surface resistance) of the transparent conductive thin film 4 thus formed is desirably in the range of about 10 to 3000 Ω/□ (represented also as Ω·□ or sq). As the film resistance value is lower, a higher antistatic effect can be obtained.

Now, another embodiment of the optical device according to the present invention will be described below.

Figure 3:
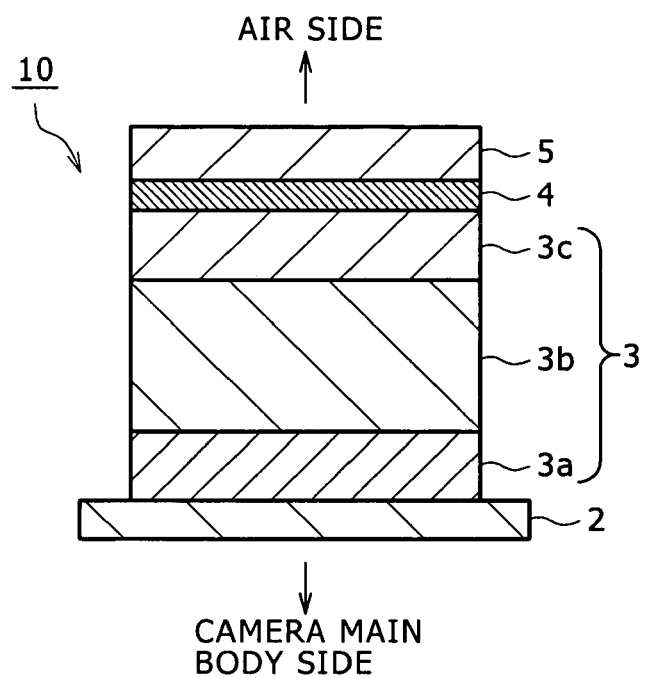
FIG. 3 is a schematic sectional diagram showing the configuration of an optical device according to another embodiment of the present invention.

A schematic sectional diagram illustrating the configuration of a further embodiment of the optical device according to the present invention is shown in FIG. 3. The optical device 10 in this embodiment has a configuration in which a dielectric film 5 is provided on the further outer layer side of the transparent conductive thin film 4 of the optical device 1 shown in FIG. 2. The dielectric film 5 is preferably formed by use of a low refractive index material such as magnesium fluoride, and may be formed by any of the methods mentioned as a method of forming the anti-reflection film in the optical device 1 as above-described. Incidentally, while the dielectric film 5 on the upper surface of the transparent conductive thin film 4 consists of a single layer in this embodiment, the dielectric film 5 may also be a dielectric layer of a multi-layer structure.

In the next place, for verifying the antistatic effect of the optical device according to the present invention, a reduction in the amount of dust artificially deposited on the optical device was examined, whereby dust deposition improvement amount was measured. This measuring method will be described referring to FIG. 4.

Figure 4:
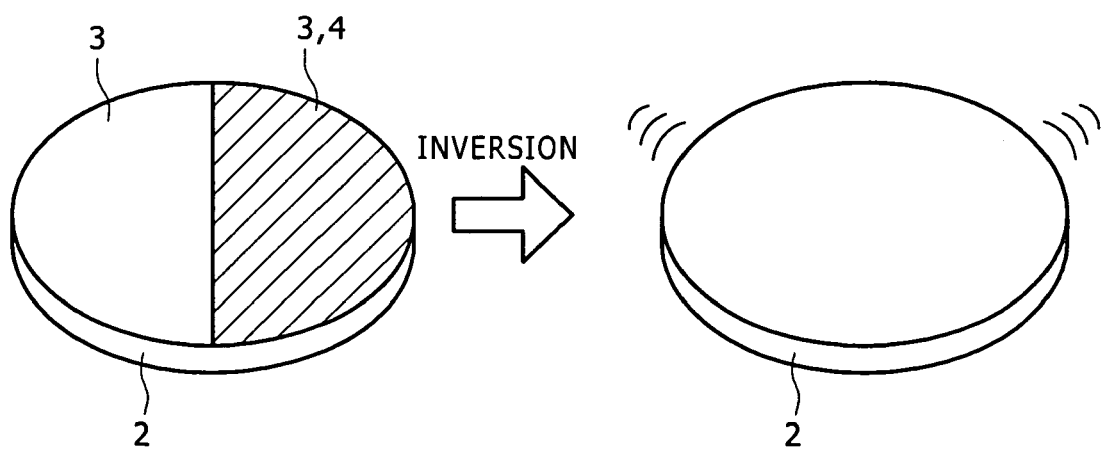
FIG. 4 illustrates a method for measuring dust deposition improvement amount pertaining to the present invention.

First, a sample is prepared in which the dielectric layer 3 shown in FIG. 2 is formed on the left half surface of a circular transparent substrate 2, and an anti-reflection film composed of a dielectric layer 3 and a transparent conductive thin film 4 is formed on the remaining right half surface of the substrate 2 (see FIG. 4, the left side). Namely, only the dielectric layer 3 is provided on one half of the sample, and the anti-reflection film configured in the same manner as in the optical device 1 is provided on the other half, by coating. Next, dust produced by processing a lens paper into fibrous form by a bar file or the like is prepared, the dust is scattered on the sample produced above, and then the optical device 1 with the dust thereon is inverted upside down (see FIG. 4, the right side). Then, the verification was conducted by a method in which the amounts of the dust remaining on the sample after a light impact on the sample are compared. The method is not limited to this method, and may be any method inasmuch as it has a process of artificially depositing debris or dust on the optical device and measuring the amount of debris or dust remaining on the optical device after an impact is given to the optical device.

As to the optical device 10 shown in FIG. 3, also, measurement is similarly conducted by preparing a sample in which only the dielectric layer 3 is provided on a left half surface of the sample, and the anti-reflection film composed of the dielectric layer 3, the transparent conductive thin film 4 and the dielectric film 5 is provided on the remaining right half surface of the sample, by coating. Incidentally, as for the optical device 10, dust deposition improvement amount was measured for samples differing in the thickness of the dielectric film 5 on the transparent conductive thin film 4.

Figure 5:
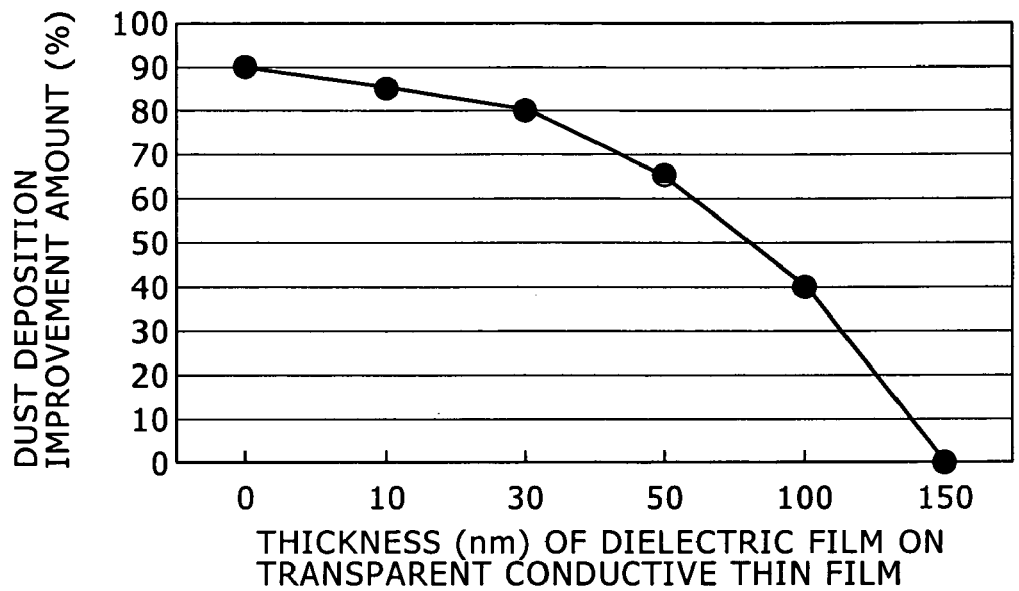
FIG. 5 is a diagram showing the results (1) of measurement of the dust deposition improvement amount pertaining to the present invention.

The results of the above measurement will be described referring to FIG. 5. In FIG. 5, the axis of abscissas represents the thickness (nm) of the dielectric film formed on the transparent conductive thin film, and the axis of ordinates represents the dust deposition improvement amount (%) on the half surface of the sample configured in the same manner as the optical device; a dust deposition improvement amount of 100% indicates the condition where the dust is completely removed so that no dust is left deposited. From FIG. 5 it is seen that the dust deposition improvement amount is the best when the dielectric film is absent on the transparent conductive thin film 4 (the thickness of the film on the transparent conductive thin film: 0 nm), i.e., when the transparent conductive thin film 4 is formed as the outermost layer of the anti-reflection film; in this case, a dust deposition preventive effect of 90% was obtained.

On the other hand, it is seen that, in the case where the dielectric film 5 is laminated on the transparent conductive thin film 4, i.e., in the case of the configuration of the optical thin film 10 (see FIG. 3), the dust deposition improvement amount is reduced and the dust deposition improvement effect is lowered as the thickness of the dielectric film 5 laminated on the transparent conductive thin film 4 becomes greater. Finally, when the thickness of the dielectric film exceeded 150 nm, the dust deposition improvement effect could not be obtained. In relation to this, when the kinds of the materials constituting the dielectric layer 3, the transparent conductive thin film 4 and the dielectric film 5 were replaced by materials having roughly equal dielectric constants, a tendency similar to the above was obtained.

Figure 6:
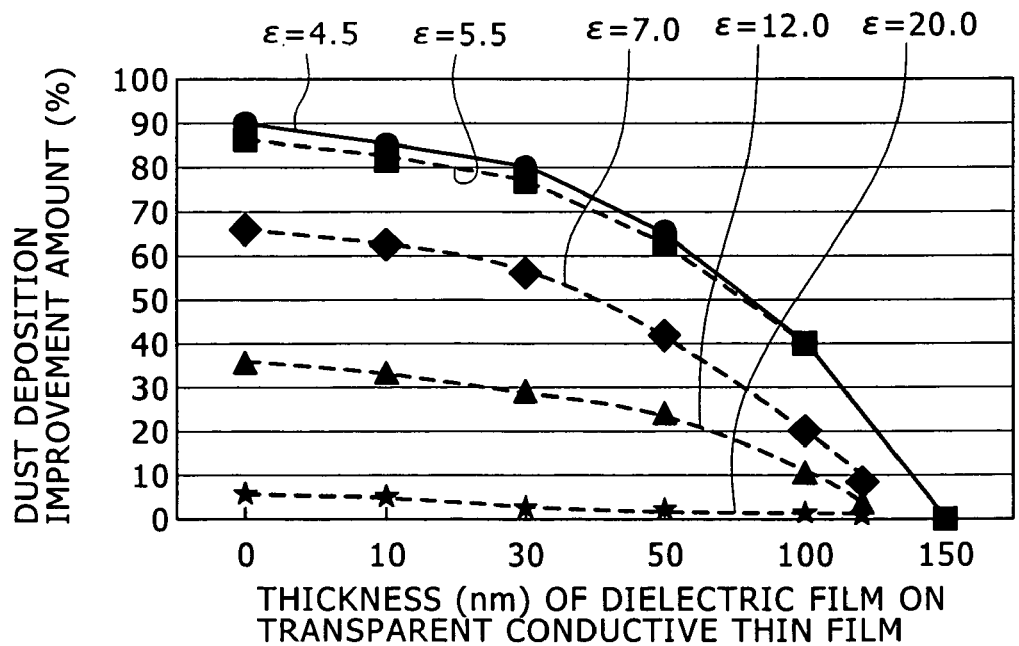
FIG. 6 is a diagram showing the results (2) of measurement of the dust deposition improvement amount pertaining to the present invention.

Furthermore, the results of an experiment the same as above except that the material of the dielectric film 5 on the transparent conductive thin film 4 was changed, i.e., the dielectric constant was changed, will be described. In FIG. 6, the axis of abscissas represents the thickness (nm) of the dielectric film formed on the transparent conductive thin film, and the axis of ordinates represents the dust deposition improvement amount (%) on the half surface of the sample configured in the same manner as the optical device. The experiment was conducted by use of five kinds of materials having dielectric constants ∈ relative to the dielectric constant of vacuum of 4.5, 5.5, 7.0, 12 and 20, respectively. Incidentally, the measurement results shown in FIG. 5 was obtained with a dielectric constant ∈ of 4.5.

It is seen that, in the case of the configuration of the optical thin film 10, the dust deposition improvement amount is reduced and the dust deposition improvement effect is lowered as the dielectric constant of the dielectric film 5 laminated on the transparent conductive thin film 4 becomes higher. This is considered to be because, as the dielectric constant of the dielectric film 5 becomes higher, the electrostatic capacity of the dielectric film 5 increases, more charge is accumulated on the outer layer side of the dielectric film 5, and adsorption of dust becomes more liable to occur. As seen from the experimental results, the dust adsorption effect can be maintained by setting the dielectric constant to be not more than about 20.

As has been described above, the dielectric film 5 is formed of a low refractive index material, examples of which include not only magnesium fluoride but also fluorine-containing inorganic or organic materials, silicon-containing inorganic or organic materials, such as silicon oxide, and mixed materials containing at least any one of these materials, with the dielectric constants of the materials being not more than 20.

For example, calcium fluoride ($CaF_2$) has a dielectric constant of 6.76, magnesium fluoride ($MgF_2$) has a dielectric constant of 4.87 (5.45), and silicon dioxide ($SiO_2$) has a dielectric constant of 4.55 (4.49). The two values of dielectric constant of a single substance are the values for isomers of the substance.

In addition, examples of the fluorine-containing organic materials (F-based organic materials) include ethylene tetrafluoride resin (PTFE), ethylene tetrafluoride-perfluoroalkyl vinyl ether copolymer resin (PFA), ethylene tetrafluoride-propylene hexafluoride copolymer resin (FEP), ethylene tetrafluoride-ethylene copolymer resin (ETFE), vinylidene fluoride resin (PVDF), and ethylene chlorotrifluoride resin (PCTFE). Of these materials, FEP has the lowest dielectric constant of about 2.0, and PVDF has the highest dielectric constant of about 6.0.

Besides, examples of the silicon-containing organic materials (Si-based organic materials) include methyl polysiloxane, octamethyl trisiloxane, decamethyl tetrasiloxane, methyl phenyl polysiloxane, and methyl hydrogen polysiloxane. These materials have dielectric constants in the range of 2.17 to 2.88. The relationships between the materials and their dielectric constants are summarized in the following table.

TABLE 1

Example of Material and Dielectric Constant

| Substance | Temperature (° C.) | Dielectric constant $\epsilon$ |
|---|---|---|
| $SiO_2$ | 20 | 4.55 (4.49) |
| $MgF_2$ | 25 | 4.87 (5.45) |
| $CaF_2$ | — | 6.76 |
| F-based organic materials | — | 2.0-6.0 |
| Si-based organic materials | — | 2.17-2.88 |

In the case where a fluorine-containing substance or a silicon-containing substance is used to form the dielectric film 5 constituting the outermost layer of the optical device 10, a water-repellent effect can be expected on the surface of the optical device.

Here, the thickness of the transparent conductive thin film of the optical device will be investigated. An example of the relationship between the thickness of the transparent conductive thin film configured in the same manner as the optical device 1 shown in FIG. 1 and reflectance characteristic is shown in FIG. 7.

Figure 7:
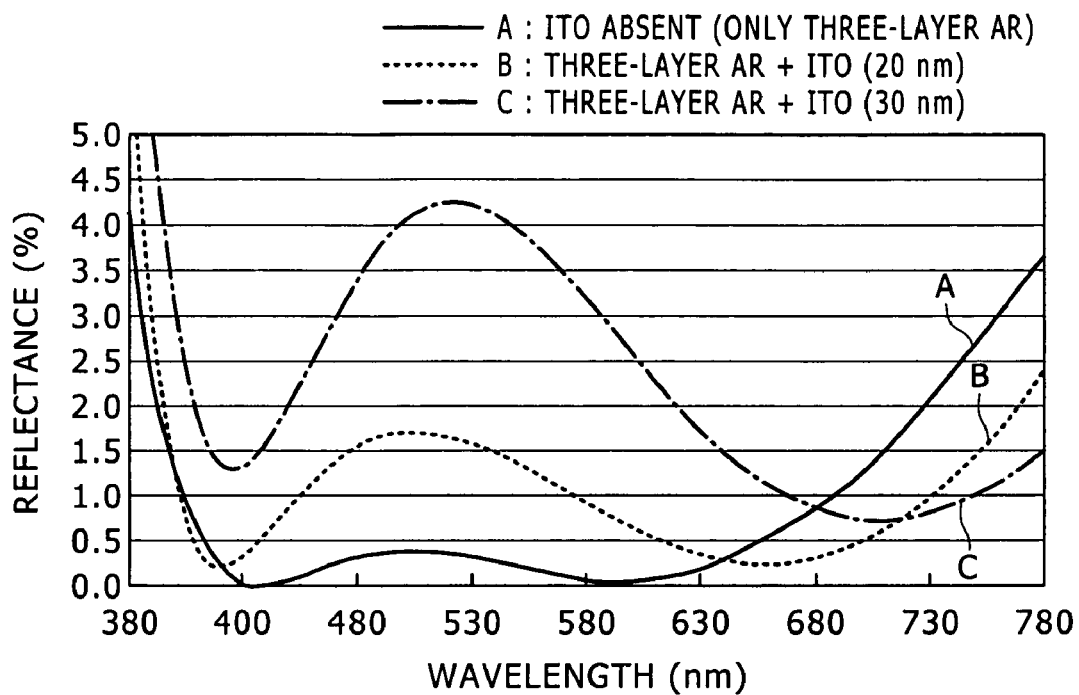
FIG. 7 is a diagram showing the thickness and the reflectance characteristic of a transparent conductive thin film according to the present invention.

In FIG. 7, the axis of abscissas represents the wavelength (nm) of light incident on the optical device, and the axis of ordinates represents reflectance (%). In the figure "ITO" denotes the transparent conductive thin film 4, and "three-layer AR" denotes the dielectric film 3. Comparing line A (ITO absent (only three-layer AR)) with line C (three-layer AR+ITO (30 nm thick)), line C shows a higher reflectance. From this it is seen that the anti-reflection effect is lowered in the configuration (see FIG. 1) where the transparent conductive thin film 4 is formed on the dielectric layer 3.

To cope with this problem, an improvement can be obtained by setting the transparent conductive thin film 4 as thin as possible, in the case of the configuration where the transparent conductive thin film 4 is formed on the dielectric layer 3 (the dielectric film on the transparent conductive thin film is 0 nm thick), i.e., in the case of the same film configuration as that of the optical device 1 shown in FIG. 1. As is clear from comparison of line B (three-layer AR+ITO (20 nm thick)) with line C (three-layer AR+ITO (30 nm thick)) shown in FIG. 7, by setting the thickness of the transparent conductive thin film 4 to be not more than 30 nm, a reflectance characteristic of not more than 2.0% can be obtained over a wavelength range of about 400 to 750 nm in which visible rays are included. Though it is more preferable that the transparent conductive thin film 4 is thinner, a good conductivity cannot be maintained if the thickness is too small. Therefore, the thickness of the transparent conductive thin film 4 is preferably in the range of about 5 to 20 nm.

Generally, in optical devices required to have higher quality, it is said that the reflectance characteristic in a desired wavelength range (e.g., visible ray region) is preferably 0.5% or below. In view of this, the case where an anti-reflection performance further better than the above-mentioned reflectance characteristic is demanded will be investigated. Here, description will be made of the fact that reflectance characteristics can be improved by further forming a dielectric film 5 of a low refractive index material such as magnesium fluoride ($MgF_2$) on the transparent conductive thin film 4.

Figure 8:
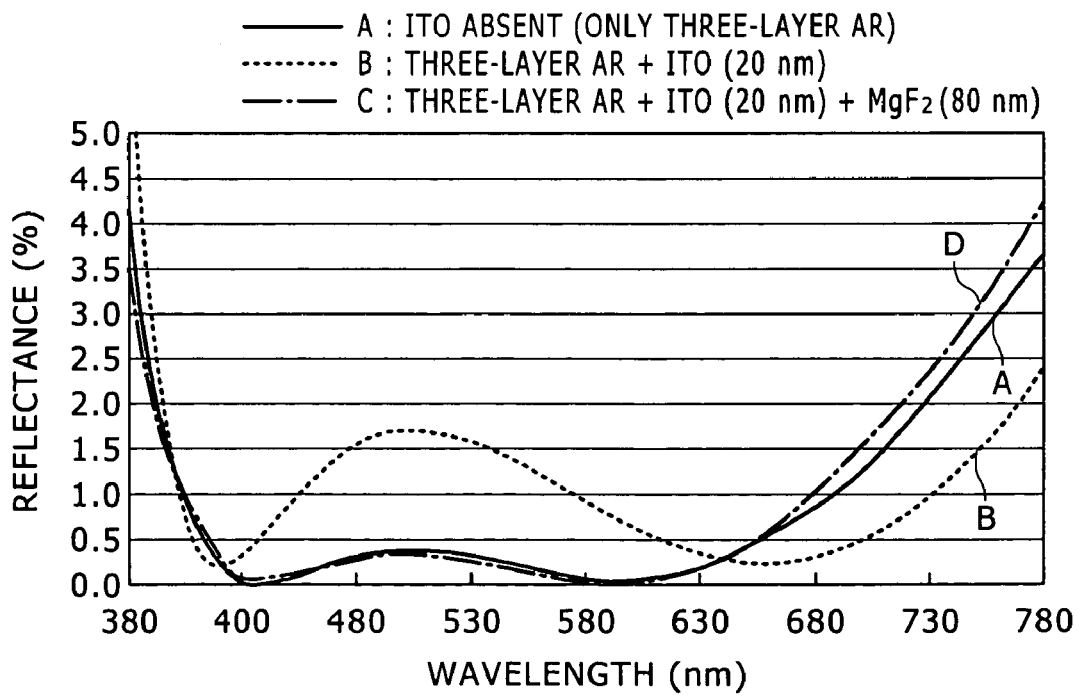
FIG. 8 is a diagram showing the reflectance characteristic in the case where an $MgF_2$ film is formed on the transparent conductive thin film according to the present invention.

FIG. 8 shows an example of reflectance characteristics in the case where a film of $MgF_2$ is formed as the dielectric film 5 on the transparent conductive thin film 4 in the optical device 10. In FIG. 8, the axis of abscissas represents the wavelength (nm) of light incident on the optical device, and the axis of ordinates represents reflectance (%). In the figure, line D indicates the reflectance characteristic in the case where an 80 nm thick $MgF_2$ film was further formed as the dielectric film 5 on the upper surface of a 20 nm thick transparent conductive thin film 4. In this film configuration example, notwithstanding the transparent conductive thin film 4 is formed in a thickness of 20 nm, the reflectance characteristic can be improved to substantially the same level as that in the case where the transparent conductive thin film 4 is absent (line A).

As the low refractive index material used here, the same materials as mentioned in the description of FIG. 3 above can be applied. Namely, usable examples include not only magnesium fluoride but also fluorine-containing inorganic or organic materials, silicon-containing inorganic or organic materials, such as silicon oxide, and mixed materials containing at least any one of these materials.

It is therefore seen from the measurement results shown in FIGS. 5 to 8 that, in the case where the dust deposition improvement effect is given the highest priority, it suffices to adopt a configuration in which the transparent conductive thin film 4 is the outermost layer in the laminate film. On the other hand, in the case where it is desired to improve the reflectance characteristic while obtaining a certain level of dust deposition improvement effect, the dielectric film 5 of a low refractive index material such as $MgF_2$ is preferably formed in a limited physical film thickness of 150 nm or below, on the outer layer side of the transparent conductive thin film 4, whereby both the dust deposition improvement effect and the anti-reflection effect can be obtained. Besides, the dust deposition improvement effect can be obtained also by setting the dielectric constant of the dielectric film 5 to be not more than 20.

Thus, the optical device according to the present invention has both an antistatic effect and an optical multi-layer effect such as anti-reflection effect, and does not need a grounding treatment for the antistatic purpose. Thus, not only the case where the optical device is applied to a general lens but also in the cases where the optical device is applied to optical devices displaying a certain optical multi-layer effect such as an optical filter, it is possible to obtain the antistatic effect while retaining the functions of the individual optical devices. In addition, the optical device can be disposed at any of various places, since it does not need a grounding treatment.

Besides, since the optical device according to the present invention has a high antistatic effect, in the case where the optical device is applied to an image pickup apparatus such as video camera and still camera, high-quality images with little influence of debris or dust can be picked up.

Incidentally, while it has been described above that the dielectric film 5 of $MgF_2$ or the like is formed on the further outer layer side relative to the transparent conductive thin film, the film 5 may not necessarily be formed of a dielectric but may be formed of any material that has a low refractive index.

Now, yet another embodiment of the optical device according to the present invention will be described below.

Figure 9:
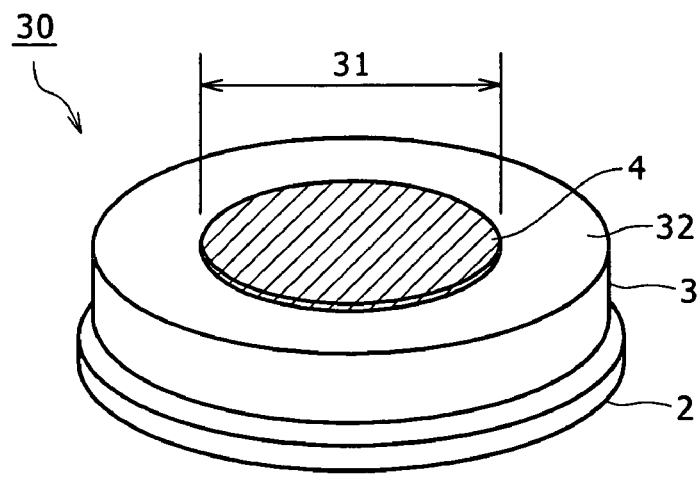
FIG. 9 is a schematic perspective view of an optical device according to a further embodiment of the present invention.

FIG. 9 is a schematic perspective view of an optical device according to yet another embodiment of the present invention. The optical device 30 shown in FIG. 3 has the same film configuration as that in FIG. 2, in which the transparent conductive thin film 4 is formed at the outermost layer. The transparent conductive thin film 4 having a diameter equal to the effective aperture diameter 31 of an image pickup apparatus, for example, is formed at a part of the outermost layer of the optical device 30, and the transparent conductive thin film 4 is not formed in a region 32 on the outer peripheral side thereof.

Figure 10:
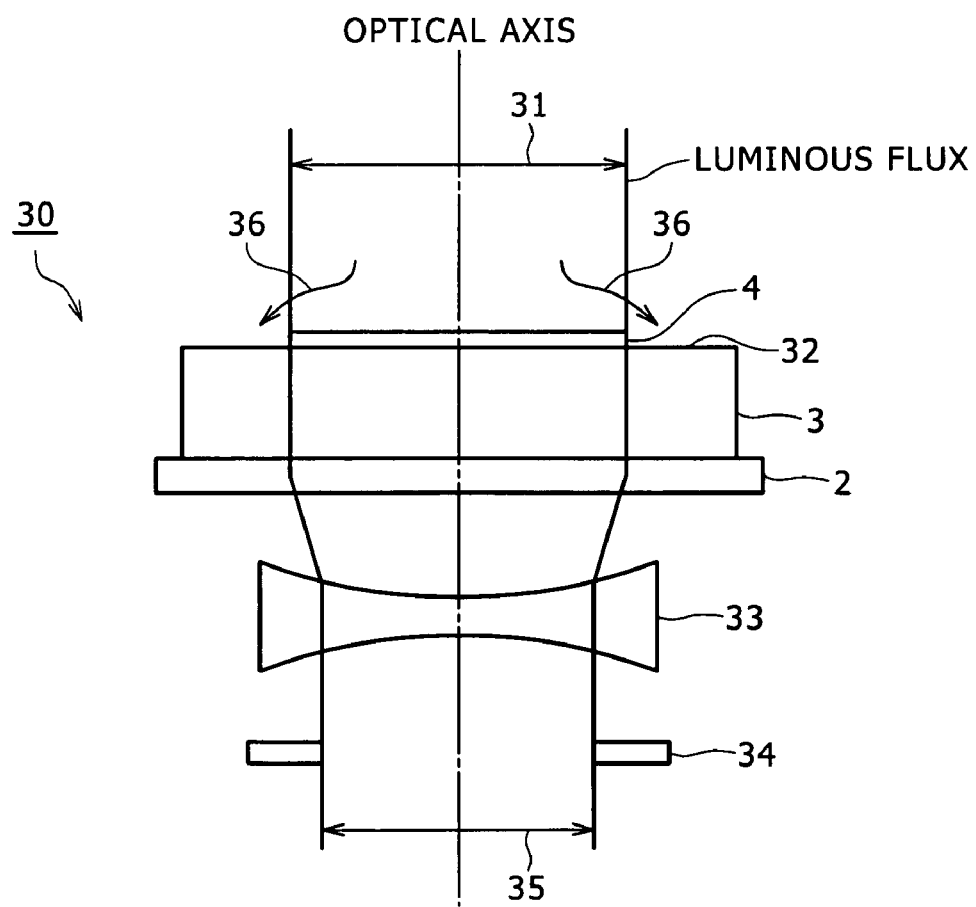
FIG. 10 illustrates the optical device shown in FIG. 9.

FIG. 10 illustrates the optical device 30 shown in FIG. 9. As illustrated in FIG. 10, a parallel luminous flux with its center on the optical axis is incident on the optical device 30 mounted to a camera. In this instance, the diameter at the lens surface of the luminous flux passing through the diaphragm diameter 35 of a diaphragm 34 is important, and this diameter is the effective aperture diameter 31. In order to obtain the dust deposition improvement effect assuredly, it is indispensable to provide the multi-layer film structure composed of the dielectric layer 3 and the transparent conductive thin film 4, at least over the range of this diameter. It is desired that the diameter of the multi-layer film is set according to the maximum value of the effective aperture diameter, taking into account the zoom and macro functions of the camera and the like factors.

Thus, the multi-layer film having the effects of the present invention is formed in the region of a part of the optical path of the luminous flux passing through the optical device 30 (the region overlapping with the effective aperture diameter) and is not formed in the region 32 where the luminous flux does not pass, whereby the debris and dust deposited in the effective aperture diameter in the past will be mostly attracted into the outer peripheral side region 32 as indicated by arrows 36, and the proportion of the debris and dust deposited in the optical path, particularly, in the effective aperture diameter can be reduced.

While only the transparent conductive thin film 4 is so formed as to fulfill the predetermined diameter in the embodiment shown in FIGS. 9 and 10, the dielectric layer 3 may also be so formed as to fulfill the predetermined diameter. In this case, the multi-layer film in the present invention is formed only in the required region, so that savings of materials and a reduction in cost can be expected. Incidentally, the embodiment shown in FIGS. 9 and 10 is naturally applicable also to the optical device 10 having the film configuration shown in FIG. 3.

Now, an embodiment in which the optical device provided on both sides with the multi-layer film according to the present invention is applied to a lens of an image pickup apparatus will be described below. In this embodiment, a camera is taken as an example of the image pickup apparatus.

Figure 11:
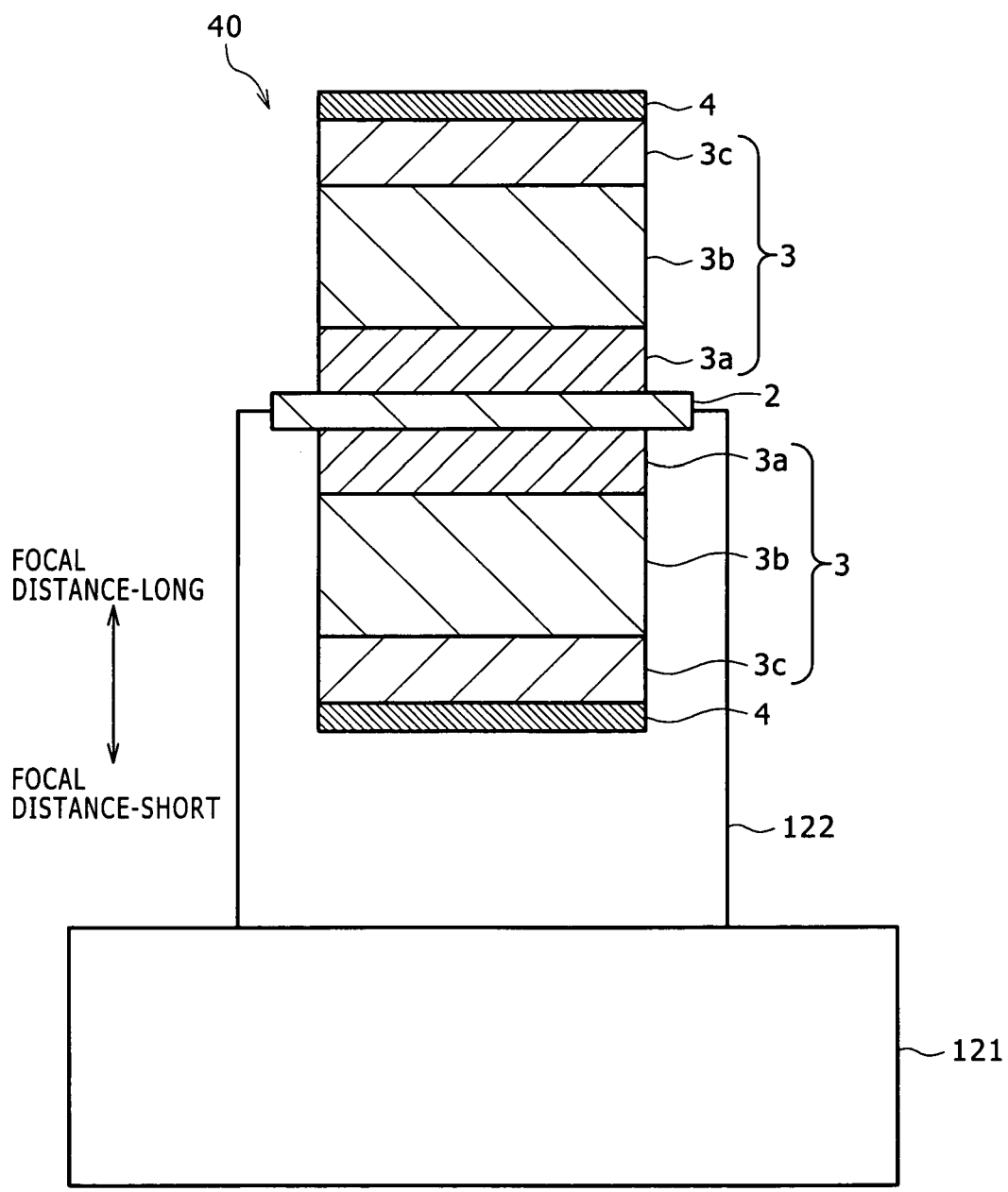
FIG. 11 illustrates an example (2) of the camera equipped with an optical device according to the present invention.

FIG. 11 is a schematic diagram showing an embodiment in which the optical device according to the present invention is applied to a focus adjustable camera. The camera 120 has a movable portion 122 having the function as a lens-barrel and having a barrel retractable type structure for adjusting the focal distance, and the optical device of the present invention is applied to a lens mounted on the barrel of the movable portion 122. Since the optical device of the present invention can have an antistatic effect without need for a grounding treatment, the degree of freedom in laying out the optical device is high, and the optical device can be mounted to such a movable portion.

The optical device 40 in this embodiment has a configuration in which an anti-reflection film is provided by coating on both sides of the transparent substrate 2 of the optical device 1 in the form shown in FIG. 2. Namely, a dielectric film 3 and a transparent conductive thin film 4 are further formed on the surface, opposite to the surface on which the dielectric film 3 and the transparent conductive thin film 4 are laminated, of the transparent substrate 2.

If the anti-reflection film should be provided by coating on only one side of the optical device 40, i.e., on only the air side as in the optical device 1, a movement of the movable portion 122 in order to adjust the focus would generate a convection, and deposition of debris and dust due to the convection would occur on the surface on the camera main body 121 side of the transparent substrate 2, i.e., the surface not provided thereon with the coating of the optical device 1 in the form shown in FIG. 1, leading to the need for a labor of wiping off the deposited debris and dust by detaching the movable portion 122 (lens-barrel).

However, where the anti-reflection film according to the present invention is provided on both sides of the lens mounted on the movable portion 22, as in the optical device 40, when the optical device 40 is moved by moving the movable portion 122, deposition of debris and dust due to convection can be suppressed on the air side and on the camera main body 121 side. This ensures that the need for the labor of wiping off the debris and dust is not generated on any of the air side and the camera main body 121 side of the optical device 40, so that management of debris and dust, for example, wiping off the debris and dust by detaching the optical device 40 is simplified, and the user is released from the troublesomeness of such a management. In addition, though the lens-barrel of the image pickup apparatus may be detached and mounted for lens exchange, deposition of debris or dust on the lens surface of the lens-barrel is not liable to occur even in such a case.

Incidentally, while the optical device 40 in which the anti-reflection film formed on the optical device 1 shown in FIG. 2 is formed on both sides of the transparent substrate 2 in FIG. 11, another configuration may be adopted in which the anti-reflection film in the optical device 10 shown in FIG. 3 is provided on both sides of the transparent substrate 2. A further configuration may also be adopted in which the different film configurations of the optical device 1 and the optical device 10 are applied in combination respectively to both sides of the transparent substrate 2.

Now, an embodiment in which the optical device according to the present invention is applied to a lens of an electronic apparatus will be described below. In this embodiment, a projector (projection type display) is taken as an example of the electronic apparatus.

Figure 12:
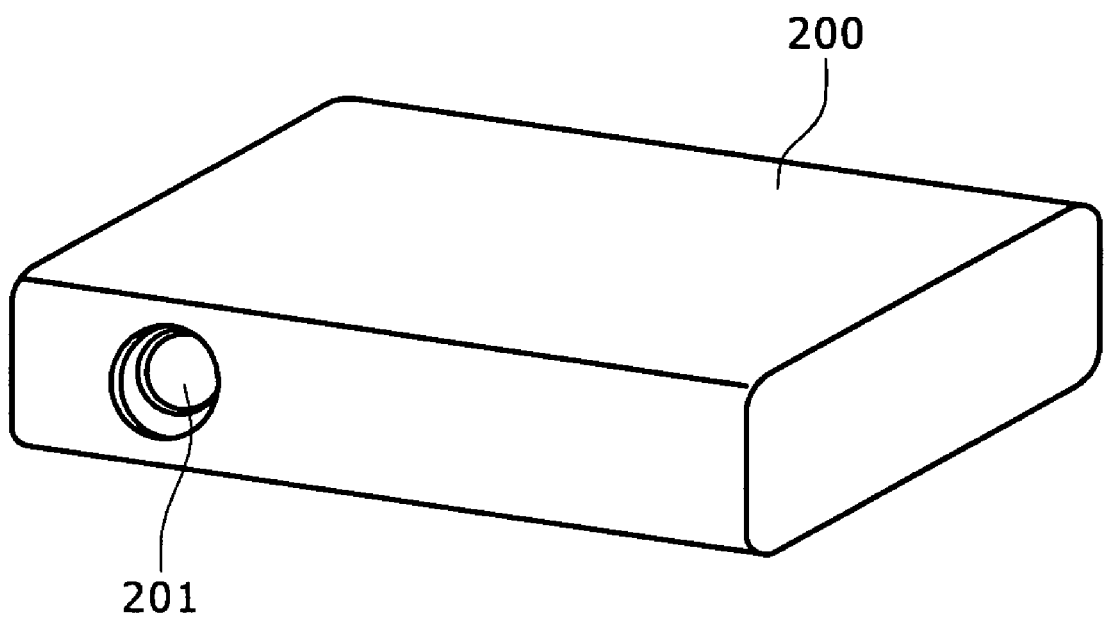
FIG. 12 shows an example of a projector equipped with an optical device according to the present invention.

An embodiment of a projector to which the optical device according to the present invention has been applied is shown in FIG. 12. Such projectors include three-tube projectors, liquid crystal projectors and the like, and all of these types are so configured that light having picture information is generated in the inside of the projector apparatus, and the light is transmitted through a projection lens to be projected on a screen. The optical device of the present invention is used for the projection lens 201 of the projector 200 shown in FIG. 12.

In many case, a fan for a heat radiating purpose is provided in the inside of the projector 200, and a convection due to the fan is generated. Therefore, where the optical device provided with the antistatic structure on both sides of a lens as shown in FIG. 11 is applied to the projection lens 201, deposition of debris or dust can be prevented not only on the external side of the projection lens 201 but also on the internal side of the projection lens 201. Incidentally, an optical device provided with the antistatic film on only one side may naturally be used.

As has been described above, by applying a multi-layer film configured as above to an optical device, it is possible to obtain a high-function optical device having both an effect of suppressing deposition of debris and dust (antistatic effect) and an optical multi-layer effect, without need for a grounding treatment.

For example, when the laminate film having the transparent conductive thin film according to the present invention is applied to an optical device such as a lens, deposition of debris or dust is less liable to occur, so that the need for preparing an ultrasonic cleaning machine for cleaning the lens, a clean room for assembly work or the like in the manufacturing site of the lens-barrel and the like is eliminated, whereby manufacturing cost can be improved markedly. In addition, deposition of debris or dust can be prevented from occurring, in the course of distribution of the optical device, the lens-barrel, and the image pickup apparatus and electronic apparatus on which these components are mounted.

While examples in which the optical device of the present invention is used for an image pickup apparatus (e.g., camera) and an electronic apparatus (e.g., projector) have been shown in FIGS. 1, 11 and 12 in the above-described embodiments, these apparatuses differ in the size ratio between the image forming device and the debris or dust. For example, comparing the image pickup device such as CCD and CMOS (Complementary Metal Oxide Semiconductor) in cameras with the liquid crystal panel in liquid crystal projectors, the image pickup device in cameras is smaller, so that the influence of debris or dust is relatively greater in the image pickup device, and the cameras are more influenced by the debris or dust. In addition, the distance between the image forming device and the optical device (e.g., optical low-pass filter) disposed on the front or rear side of the image forming device is relatively greater in projectors but smaller in cameras, so that the influence is again greater in cameras. Therefore, the enhancement of image quality by the dust deposition improvement effect (antistatic effect) of the present invention is more conspicuous in image pickup apparatuses such as cameras than in electronic apparatuses such as projectors.

Incidentally, the present invention is not limited to the above-described embodiments, and other various configurations are possible within the scope of the invention.

For example, while an example of applying the optical device to a camera lens has been described in the embodiments above, the optical device of the invention is applicable to other various optical devices such as IR cut filter, bent prism, optical low-pass filter, on-chip lens of image pickup device, etc. In addition, the present invention can be applied to various transparent substrates such as glass lens and plastic lens of spectacles, CRT of TV receivers, display portion of portable audio players, etc.

Besides, where the optical device of the present invention is mounted on an image pickup apparatus such as a camera or an electronic apparatus such as a projector, the number of the optical device(s) mounted may be more than one (e.g., plural), and can be appropriately adopted according to the kind of the apparatus.

The invention claimed is:

1. An optical device, comprising:
   a transparent substrate; and
   a multilayer film including:
      a multilayer dielectric structure formed on a surface of the transparent substrate and being formed of at least three dielectric layers, a first layer of the at least three dielectric layers contacting the transparent substrate, a second layer of the dielectric layers contacting the first layer and having a higher refractive index, and a third layer of the dielectric layers contacting the second layer and having a lower refractive index, the first layer of the dielectric layers having a refractive index that is intermediate to the higher refractive index and the lower refractive index, and
      a transparent conductive thin film having a predetermined thickness formed atop an outermost one of the at least three dielectric layers of the multi-layer dielectric structure.

2. The optical device as set forth in claim 1, further comprising:
   a thin film provided on an outer layer side relative to the transparent conductive thin film, the thin film having a thickness less than or equal to 150 nm.

3. The optical device as set forth in claim 2, wherein the thin film includes a substance selected from the group consisting of substances containing fluorine as a component, substances containing silicon as a component, and mixtures thereof.

4. The optical device as set forth in claim 2, wherein the thin film includes a material selected from the group consisting of silicon oxide, magnesium fluoride, calcium fluoride, and mixtures thereof.

5. The optical device as set forth in claim 2, wherein the thin film includes a single layer or a plurality of layers.

6. The optical device as set forth in claim 1, further comprising:
   a thin film provided on an outer layer side relative to the transparent conductive thin film, the thin film having a dielectric constant less than or equal to 20.

7. The optical device as set forth in claim 6, wherein the thin film includes a substance selected from the group consisting of substances containing fluorine as a component, substances containing silicon as a component, and mixtures thereof.

8. The optical device as set forth in claim 6, wherein the thin film includes a material selected from the group consisting of silicon oxide, magnesium fluoride, calcium fluoride, and mixtures thereof.

9. The optical device as set forth in claim 6, wherein the thin film includes a single layer or a plurality of layers.

10. The optical device as set forth in claim 1, further comprising:
a thin film provided on an outer layer side relative to the transparent conductive thin film, the thin film having a thickness less than or equal to 150 nm, and a dielectric constant less than or equal to 20.

11. The optical device as set forth in claim 10, wherein the thin film includes a substance selected from the group consisting of substances containing fluorine as a component, substances containing silicon as a component, and mixtures thereof.

12. The optical device as set forth in claim 10, wherein the thin film includes a material selected from the group consisting of silicon oxide, magnesium fluoride, calcium fluoride, and mixtures thereof.

13. The optical device as set forth in claim 10, wherein the thin film includes a single layer or a plurality of layers.

14. The optical device as set forth in claim 1, wherein the transparent conductive thin film has a thickness of 5-20 nm.

15. The optical device as set forth in claim 14, wherein the transparent conductive thin film includes a material selected from the group consisting of ITO, FTO, ATO, gold, silver, copper, aluminum, and mixtures thereof.

16. The optical device as set forth in claim 1, wherein the multilayer film is formed at least in an effective aperture diameter of an apparatus on which the optical device is mounted.

17. The optical device as set forth in claim 1, further comprising:
another multilayer film formed on the other side of the transparent substrate, the another multilayer film including
a dielectric film having a multilayer structure, and
a transparent conductive thin film having a predetermined thickness formed at a part of the layers of the dielectric film of the another multi-layer structure.

18. The optical device as set forth in claim 17, wherein the dielectric film of the another multi-layer film has a multi-layer dielectric structure formed on a surface of the transparent substrate and formed of at least three dielectric layers, each one of the at least three dielectric layers contacts at least another one of the at least three dielectric layers, at least one of the dielectric layers has a higher refractive index and a thickness of about $2\lambda/4$, at least another one of the dielectric layers has a lower refractive index and a thickness of about $\lambda/4$, at least a further one of the dielectric layers has a refractive index that is intermediate to the higher refractive index and the lower refractive index and a thickness of about $\lambda/4$, where $\lambda$ is a wavelength of light.

19. The optical device as set forth in claim 1, wherein the second layer having the higher refractive index has a thickness of about $2\lambda/4$, the third layer having the lower refractive index has a thickness of about $\lambda/4$, and the first having the intermediate refractive index has a thickness of about $\lambda/4$, where $\lambda$ is a wavelength of light.

20. A lens-barrel, comprising:
a barrel; and
an optical device held on the barrel, the optical device including:
a transparent substrate, and
a multi-layer film including:
a multi-layer dielectric structure formed on a surface of the transparent substrate and being formed of at least three dielectric layers, a first layer of the at least three dielectric layers contacting the transparent substrate, a second layer of the dielectric layers contacting the first layer and having a higher refractive index, a third layer of the dielectric layers contacting the second layer and having a lower refractive index, the first layer of the dielectric layers having a refractive index that is intermediate to the higher refractive index and the lower refractive index, and
a transparent conductive thin film having a predetermined thickness formed atop an outermost one of the at least three dielectric layers of the multi-layer dielectric structure.

21. The lens-barrel as set forth in claim 20, wherein the first layer having the higher refractive index has a thickness of about $2\lambda/4$, the second layer having the lower refractive index has a thickness of about $\lambda/4$, and the third layer having the intermediate refractive index has a thickness of about $\lambda/4$, where $\lambda$ is a wavelength of light.

22. An image pickup apparatus, comprising:
an optical device disposed in an optical path; and
an image pickup device disposed in the optical path;
the optical device including:
a transparent substrate, and
a multi-layer film including:
a multi-layer dielectric structure formed on a surface of the transparent substrate and being formed of at least three dielectric layers, a first layer of the at least three dielectric layers contacting the transparent substrate, a second layer of the dielectric layers contacting the first layer and having a higher refractive index, and a third layer of the dielectric layers contacting the second layer and having a lower refractive index, the first layer of the dielectric layers having a refractive index that is intermediate to the higher refractive index and the lower refractive index, and
a transparent conductive thin film having a predetermined thickness formed atop an outermost one of the at least three dielectric layers of the multi-layer dielectric structure.

23. The image pickup apparatus as set forth in claim 22, wherein the optical device is mounted to a movable portion of the image pickup apparatus.

24. The image pickup apparatus as set forth in claim 23, wherein the movable portion is of a barrel retractable type structure in which the optical device is moved in the direction of an optical axis.

25. The image pickup apparatus as set forth in claim 22, wherein the first layer having the higher refractive index has a thickness of about $2\lambda/4$, the second layer having the lower refractive index has a thickness of about $\lambda/4$, and the third layer having the intermediate refractive index has a thickness of about $\lambda/4$, where $\lambda$ is a wavelength of light.

26. An electronic apparatus for displaying information by transmitting light generated inside the apparatus through an optical device disposed in an optical path, the optical device comprising:
a transparent substrate; and
a multi-layer film including:
a multi-layer dielectric structure formed on a surface of the transparent substrate and being formed of at least three dielectric layers, a first layer of the at least three dielectric layers contacting the transparent substrate, a second layer of the dielectric layers contacting the first layer and having a higher refractive index, and a third layer of the dielectric layers contacting the second layer and having a lower refractive index, the first layer of the dielectric layers having a refractive index that is intermediate to the higher refractive index and the lower refractive index, and a transparent conductive thin film having a predetermined thickness formed atop an outermost one of the at least three dielectric layers of the multi-layer dielectric structure.

27. The electronic apparatus as set forth in claim 26, wherein the light generated inside the electronic apparatus is transmitted through the optical device so as to be projected onto a screen.

28. The electronic apparatus as set forth in claim 26, wherein the first layer having the higher refractive index has a thickness of about $2\lambda/4$, the second layer having the lower refractive index has a thickness of about $\lambda/4$, and the third layer having the intermediate refractive index has a thickness of about $\lambda/4$, where $\lambda$ is a wavelength of light.

* * * * *